United States Patent
English et al.

(10) Patent No.: US 10,486,480 B2
(45) Date of Patent: Nov. 26, 2019

(54) ROAD AND RAIL CONVERTIBLE TRAILER

(71) Applicant: RailPod, Inc., Boston, MA (US)

(72) Inventors: Brendan English, Brookline, MA (US);
Paul Sandin, Brookline, NH (US);
James Forte, Grafton, MA (US)

(73) Assignee: RailPod, Inc., Boston, MA (US)

( * ) Notice: Subject to any disclaimer, the term of this patent is extended or adjusted under 35 U.S.C. 154(b) by 75 days.

(21) Appl. No.: 15/625,157

(22) Filed: Jun. 16, 2017

(65) Prior Publication Data
US 2017/0361670 A1   Dec. 21, 2017

Related U.S. Application Data

(60) Provisional application No. 62/351,360, filed on Jun. 17, 2016.

(51) Int. Cl.
*B60F 1/04* (2006.01)

(52) U.S. Cl.
CPC .......... *B60F 1/046* (2013.01); *B60F 2301/04* (2013.01)

(58) Field of Classification Search
CPC ....................................................... B60F 1/046
USPC ...................................................... 105/215.2
See application file for complete search history.

(56) References Cited

U.S. PATENT DOCUMENTS

| | | | | |
|---|---|---|---|---|
| 1,742,154 A | * | 12/1929 | Vernon ................... | B60F 1/043 105/72.2 |
| 1,800,236 A | * | 4/1931 | Wasson ................... | B60F 1/043 105/72.2 |
| 3,332,362 A | * | 7/1967 | Fisher ..................... | B60F 1/043 105/177 |
| 3,338,184 A | * | 8/1967 | Fisher ..................... | B60F 1/043 105/215.2 |
| 3,765,703 A | * | 10/1973 | Voelkerding ............ | B60D 1/36 116/28 R |
| 3,905,306 A | * | 9/1975 | Janes ...................... | B60F 1/046 105/215.2 |
| 4,497,257 A | * | 2/1985 | White, Jr. ............... | B60F 1/043 105/215.2 |
| 4,843,973 A | * | 7/1989 | Hartelius ................ | B60F 1/043 105/26.1 |

(Continued)

FOREIGN PATENT DOCUMENTS

| | | |
|---|---|---|
| DE | 2521547 A1 | 12/1976 |
| EP | 1378380 A1 | 1/2004 |

(Continued)

*Primary Examiner* — Jason C Smith
(74) *Attorney, Agent, or Firm* — Clocktower Law; Erik J. Heels; Michael A. Bartley

(57) ABSTRACT

A convertible trailer for road and rail operation has four rail wheels and two road wheels. Each road wheel is within a road wheel assembly which connects to a main pivot or axle on the trailer, around which the entire assembly can rotate and thereby separating the road wheels from direct connection to the trailer. A lift, which may be motorized or hand controlled, raises and lowers the entire trailer by raising or lowering a foot which engages with the ground. When raised sufficiently and a locking mechanism disengaged, the road wheel assemblies may pivot on the pivot or axle. This pivoting allows the wheels to be locked in high position out of the way for rail operation. With the road wheels disengaged, the trailer may be lowered allowing the rail wheels to contact rails for railway operation.

14 Claims, 9 Drawing Sheets

(56) References Cited

U.S. PATENT DOCUMENTS

2004/0089192 A1* 5/2004 Jacob .................... B61D 15/00
                                                                     105/215.2
2017/0267264 A1* 9/2017 English ................. G01N 27/82
2017/0361670 A1* 12/2017 English ................. B60F 1/046

FOREIGN PATENT DOCUMENTS

| | | |
|---|---|---|
| EP | 1976716 B1 | 12/2009 |
| FR | 2854102 A1 | 10/2004 |
| FR | 2905896 B1 | 12/2008 |
| FR | 2987579 A1 | 9/2013 |
| GB | 402247 A | 11/1933 |

\* cited by examiner

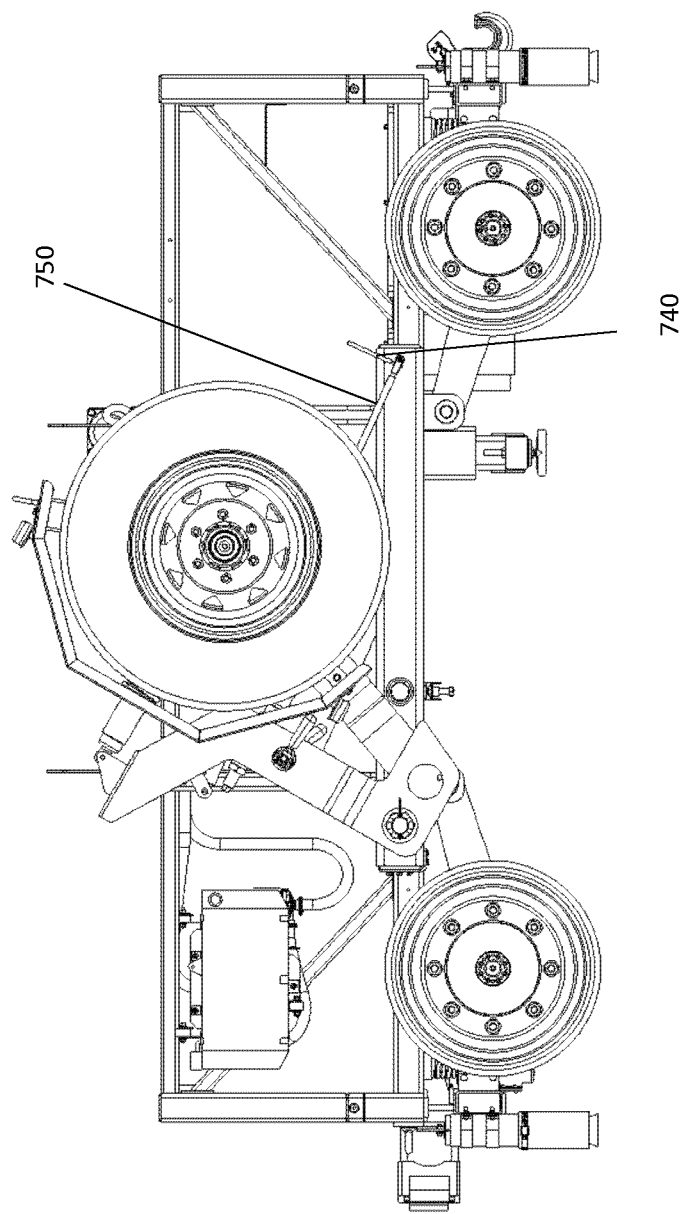

ROAD AND RAIL CONVERTIBLE TRAILER

CROSS-REFERENCE TO RELATED APPLICATIONS

This utility patent application claims priority from U.S. provisional patent application Ser. No. 62/351,360, filed Jun. 17, 2016, titled "Road and Rail Convertible Trailer" and naming inventors Brendan English and Paul Sandin.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 RailPod, Inc.

BACKGROUND

Field of Technology

This relates to rail vehicles, and more particularly to vehicles which can convert from rail to road use.

Background

Certain rail vehicles, such as track inspection vehicles, are operated periodically on rail lines and need to be frequently removed from a rail line for storage or transfer to a different rail line. Traditionally, this requires loading onto trailers for road transportation. To ease transportation, it is beneficial for vehicles to be able to operate on both railways and roadways. Existing rail-to-road solutions are generally of larger vehicles, and not designed for smaller purposes such as a small rail inspection vehicle.

Description of Prior Art

U.S. Pat. No. 3,905,306 (Sep. 16, 1975, James, "Convertible Rail-Highway Mine Car") discloses, in the Abstract, "A convertible rail-ground mine supply car with good ground clearance is described which operates both on rails and the mine floor surface which is equipped with rail-engaging wheels and manually operated ground-engaging wheels which are quickly and easily converted from the up or down position. The convertible rail-ground mine supply car is also equipped with a tongue which can be stored inconspicuously in the body of the car while the car is on the rails and can be extended readily upon the body of the car and adjusted for attachment to a mine tractor or the like."

U.S. Pat. No. 3,338,184 (Aug. 29, 1967, Fisher, "Convertible Rail-Highway Car") discloses, "in the Abstract, "A road-rail vehicle having built-in jacking means for elevating the vehicle and rail-engaging wheels relative to each other and jacking means to move the vehicle or the rail-engaging wheels horizontally relative to each other."

U.S. Pat. No. 3,332,362 (Jul. 25, 1967, Fisher, "Convertible Rail-Highway Trailer") discloses "The invention consists essentially in providing a vehicle of the trailer type with two sets of wheels interchangeable with each other. One set of pneumatic wheels for use in highway travel and the other set for use in travelling along the rails of a railroad. Also included is a set of set-off wheels mounted on the ends of brackets which are pivotally mounted on the vehicle and can be braced in a vertical position below the vehicle for engagement with set-off rails set transverse to the main rail line for the purpose of moving the vehicle sideways to a position alongside the rail line. When not in use, the set-off wheel brackets are pivoted into a position under the vehicle and secured."

None of the above provides road and rail vehicle with (1) convertible to a road trailer with a standard hitch for towing, (2) road wheels separately movable between road-use and rail-use positions, and (3) self-supporting stability during transition between road and rail vehicle. What is needed, therefore, is a vehicle that overcomes the above-mentioned limitations and that includes the features enumerated above.

BRIEF SUMMARY

A convertible trailer for road and rail operation has four rail wheels and two road wheels. Each road wheel connects to a retaining plate, with a fixed axle connecting the retaining plates while not directly connecting the wheels. A lift, which may be motorized or hand controlled, raises and lowers the entire trailer by raising or lowering a foot which engages with the ground. When raised sufficiently and a locking mechanism disengaged, the retaining plates, and connected road wheels, may slide and pivot on the fixed axle. This pivoting allows the wheels to be locked in high position out of the way for rail operation. With the road wheels disengaged, the trailer may be lowered allowing the rail wheels to contact rails for railway operation. A coupler to a trailer hitch is used for connection to road vehicles for road operation. For rail operation, the trailer may be pushed by other rail vehicles, or a motor may be connected to the chassis to drive the rail wheels enabling autonomous operation on railways.

Features and Advantages

The use of the trailer wheels allows the vehicle to be transported on the road system and set on at any road crossing or level embedded track. The trailer hitch allows the rail vehicle to be towed on a road system by any road bound vehicle with a tow hitch. There is no need for a dedicated trailer to transport the equipment to the railroad tracks. This also allows the inspection vehicle to be fully equipped and picked up at another road crossing without the need for a trailer or dedicated piece of transport equipment.

This design allows for one worker to transport the vehicle to the road crossing, lift the vehicle off the road wheels, retract the road wheels, and lower on to the railroad track. No special tools or special equipment is required to complete the transition from road to rail operations. The entire transition from road configuration to rail configuration is less than five minutes, minimizing the time for the worker to physically obstruct a road crossing and much fast than other solutions, where some inspection equipment takes over ten minutes to unload and load or may require multiple workers to safely unload and load the equipment on the railroad tracks.

The trailer wheels require no hydraulics eliminating the need for servicing or the need for any auxiliary power. The lift jack contains a rotary handle (e.g. if the electric battery depletes or the electric motor fails) that can be used to raise and lower the vehicle and the associated trailer wheels.

For extended rail bound operations or in extreme conditions where the vehicle is operating in narrow rail corridors, the trailer wheels may be removed through the removal of the retaining nut.

If a flat tire occurs, the weight of the vehicle can be supplemented by the lift jack and trailer hitch obviating the need for a dedicated jack to replace a tire.

BRIEF DESCRIPTION OF THE DRAWINGS

In the drawings, closely related figures and items have the same number but different alphabetic suffixes. Processes, states, statuses, and databases are named for their respective functions.

FIG. 9 is the side view of FIG. 8 with the alternate road wheel assembly in a raised position.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

"Set On"—the act of physically placing a piece of rail equipment on the railroad track. This can be conducted at a road crossing or in a rail yard.

"Railbound"—a vehicle that is designed to be operated and transported by rail exclusively.

Operation

Figure 1:
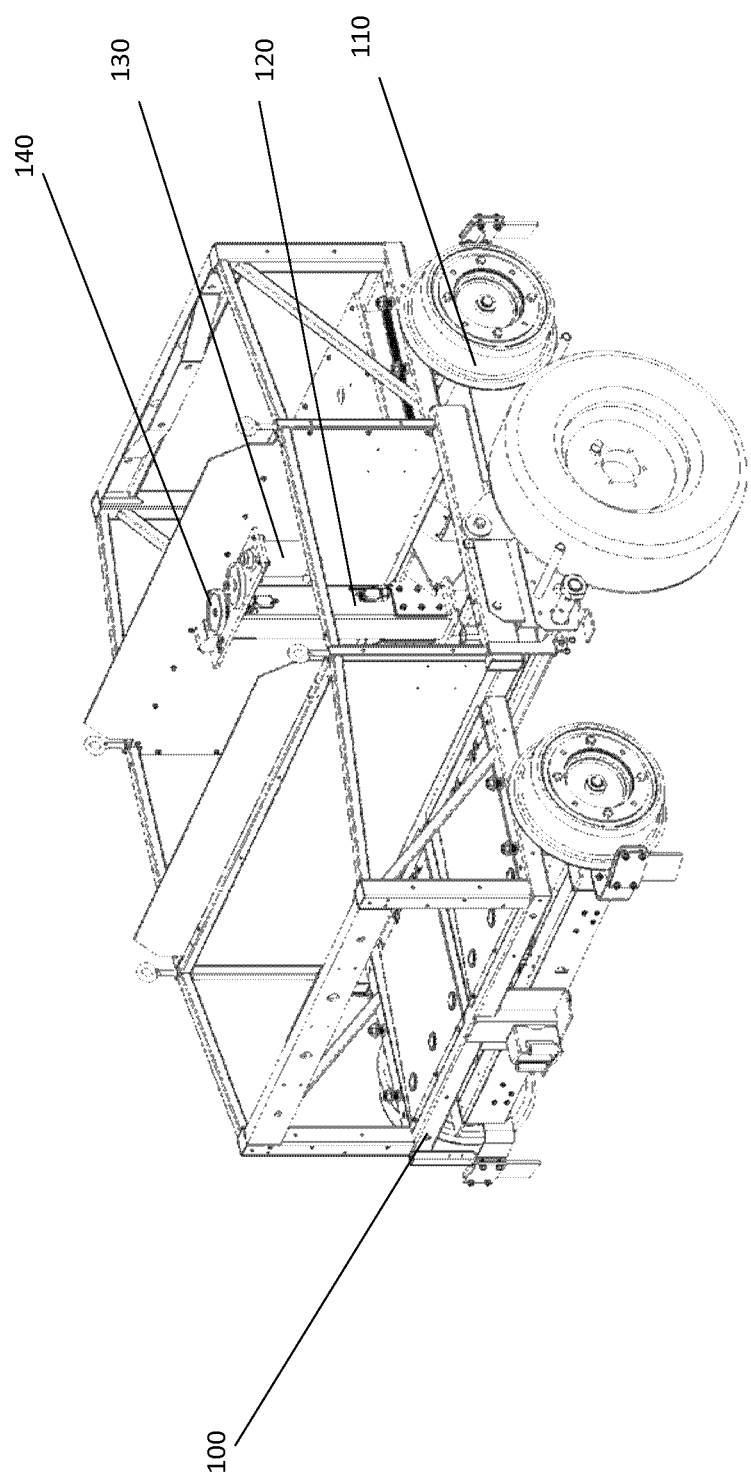
FIG. 1 is side perspective view of the trailer.

Referring to FIG. 1, the trailer wheel assembly is shown in "trailer" mode. A chassis 100 is connected to four rail wheels 110 (two on each side of the trailer). The overall dimensions of the chassis or inspection equipment is not to exceed dimensions of road systems or dimensions and weight that would prevent a truck from being able to tow the chassis on the road system. The width is to fit over standard railway track. The chassis may be connected to rail inspection equipment or other loads for deployment on rail lines. A preferred embodiment may include a autonomous rail inspection vehicle supported and connection to the chassis, with the vehicle driving the four rail wheels.

A lift jack 120 connected in the center of the chassis raises or lowers the entire vehicle. The lift jack has an acme screw attached to a foot that is wide enough to stabilize the vehicle in a raised state when in contact with the ground, whereby the width of the foot may be as small as three feet and capable of lifting weights as small as little as 1,000 lbs and upwards of 10,000 lbs. In a preferred embodiment, a lift motor 130 of suitable size to raise the full weight of the trailer turns gears 140 to raise or lower the foot via the acme screw inside vertical housing of the lift jack. Alternate means to turn the gears, such as connection to a hand crank, may be used in place of or in conjunction with the motor.

Figure 2:
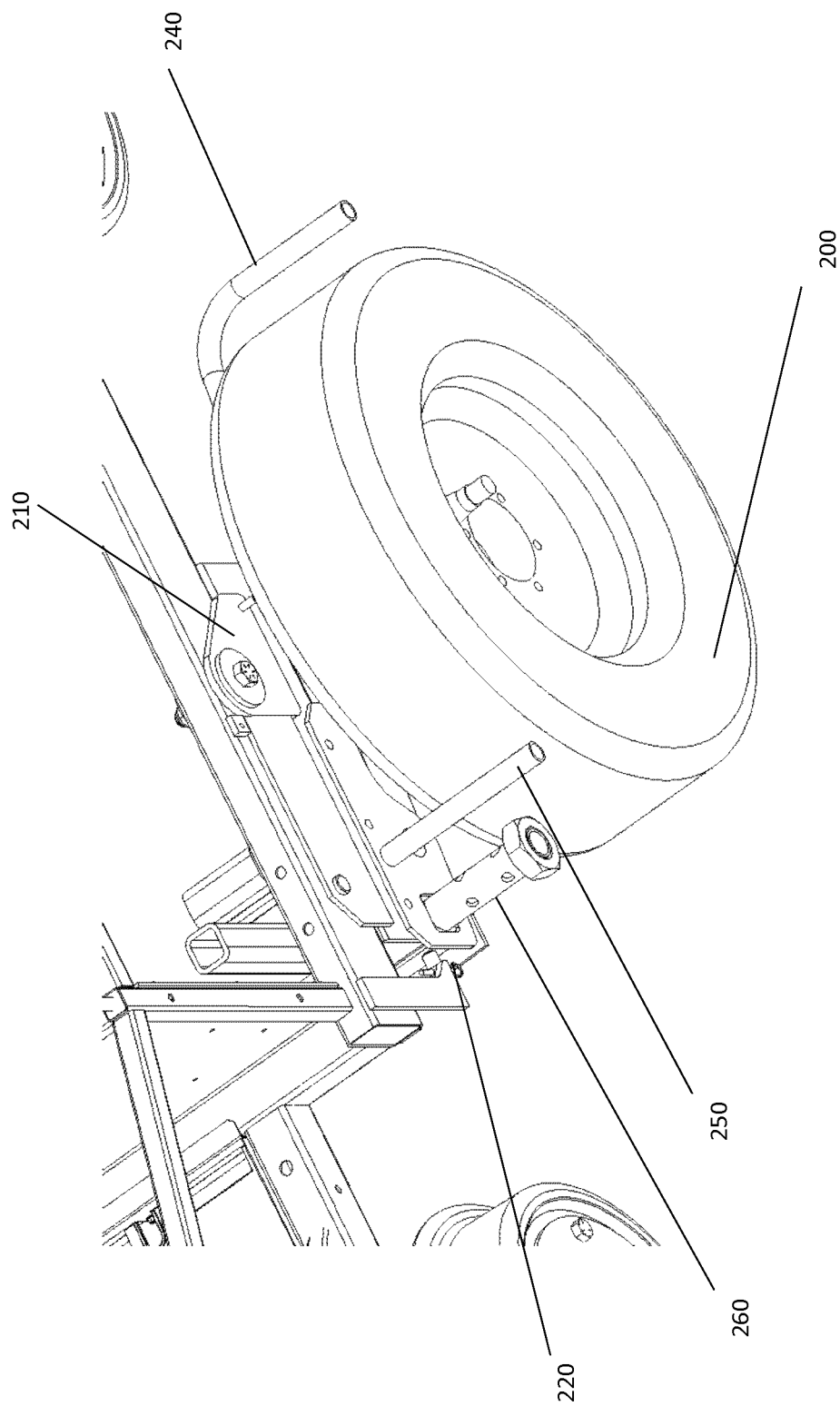
FIG. 2 is top-down perspective view of a road wheel of the trailer.

Referring also to FIG. 2, a road wheel assembly consists of a wheel 200, retaining plate 210, quick release pins 220, a short axle, rear handle 240 and front handle 250. The wheel assembly and combined axles and retaining plates are designed with sufficient strength to support loads ranging from 1000 lbs to over 10,000 lbs trailer weights. Additionally, the combination of the fixed square axle and retractable retaining plates prevent any trailer wheel miss-alignment during road operations but still allow for repeatable removal and re-installation for railroad operations. The wheel pivots on the short axle (hidden from view in the figure by the wheel), which connects to the retaining plate. Quick release pins, or equivalent locking mechanism, keep the road wheel assembly in a fixed position by locking with fixed axle 260. The fixed axle connects to and runs across the entire chassis, connecting to two road wheel assemblies. All of the trailer wheel parts and completed assemblies are capable of withstanding high impact loads encountered on a road or highway environment. More specifically, the precise tolerances between the fixed axle and the fixed chassis as it relates to the supporting structure mating surface allows for extreme impact loads, encountered in highway use, in excess of 10 g's to be transferred from the wheel assembly into the chassis without distorting the relationship of the wheel assembly to the fixed chassis.

Figure 3:
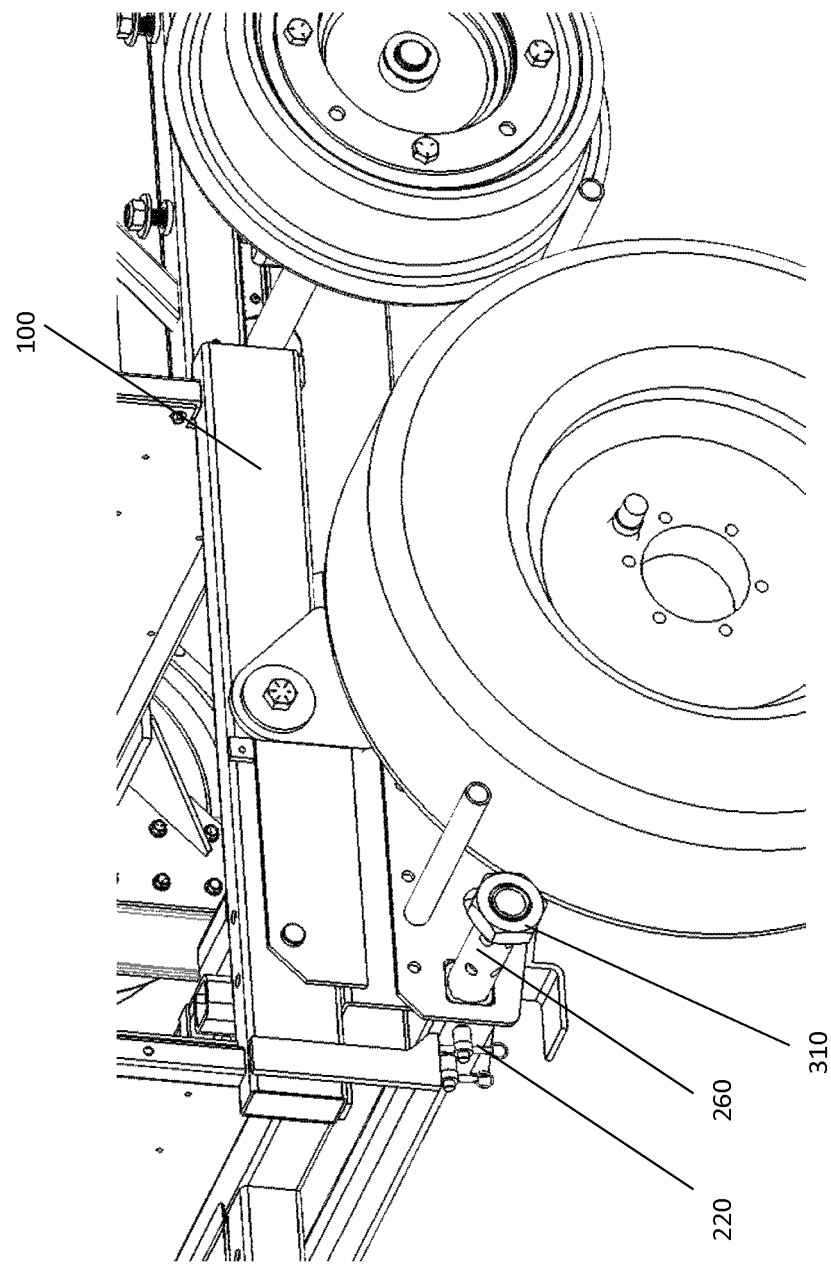
FIG. 3 is a side perspective view of the road wheel shown in FIG. 2.

Referring also to FIG. 3, when quick release pins 220 are released, the road wheel assembly can slide along fixed axle 260. A retaining nut 310 at each end of the fixed axle may prevent the road wheel assemblies from sliding off the fixed axle. When slid out to clear any obstruction from chassis 100, the road wheel assembly may rotate on the fixed axle, moving the wheel between a down position (for use as on roads as a trailer vehicle) and an up position (for use on rail tracks). The front and rear handles are included to provide grips to slide and rotate an unlocked wheel assembly, and in alternative embodiments may be replaced with equivalent controls such as a single handle or motorized control for automatically moving the road wheel assembly between up and down positions.

Operation of the road and rail vehicle comprises operating as a trailer on roads, with the two road wheel assemblies locked in the down position, and on rails as a pushed or autonomous vehicle with the two road wheel assemblies locked in the up position. Transforming from down to up positions involves operating the lift jack, via lift motor or hand crank, to deploy the foot and raise the vehicle to a height such that the road wheels will not engage the ground when in the down position. The road wheel assemblies are then unlocked, rotated, slid, and relocked in the down position. The vehicle is then lowered, via the lift jack and foot, until the road wheels engage the ground and support the weight of the vehicle. The foot may be raised fully within the vehicle to maximize clearance over ground obstacles. The reverse process is used to convert to rail operation. The foot is deployed, via the lift jack, to raise the vehicle sufficiently that the road wheels do not engage the ground. The road wheel assemblies are unlocked, slid, rotated, and relocked in the up position. The vehicle is then lowered, via the lift jack and foot, until the rail wheels engage rail lines (if lowered directly onto a railway) or the ground (if deployed to immediately drive or be pushed onto a railway). The foot may be raised fully within the vehicle to maximize clearance over ground obstacles.

Figure 4:
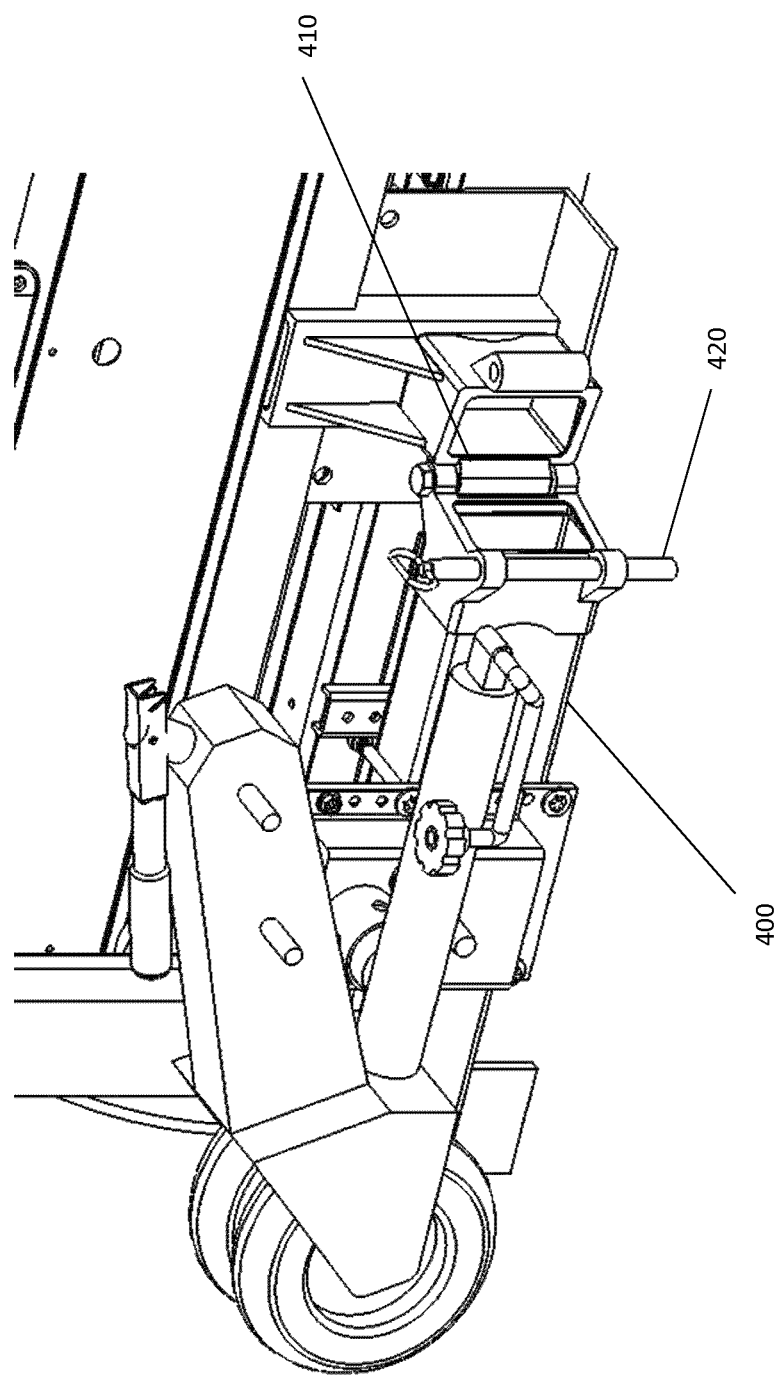
FIG. 4 is a front view of the trailer tongue and pivot point in the retracted state.
Figure 5:
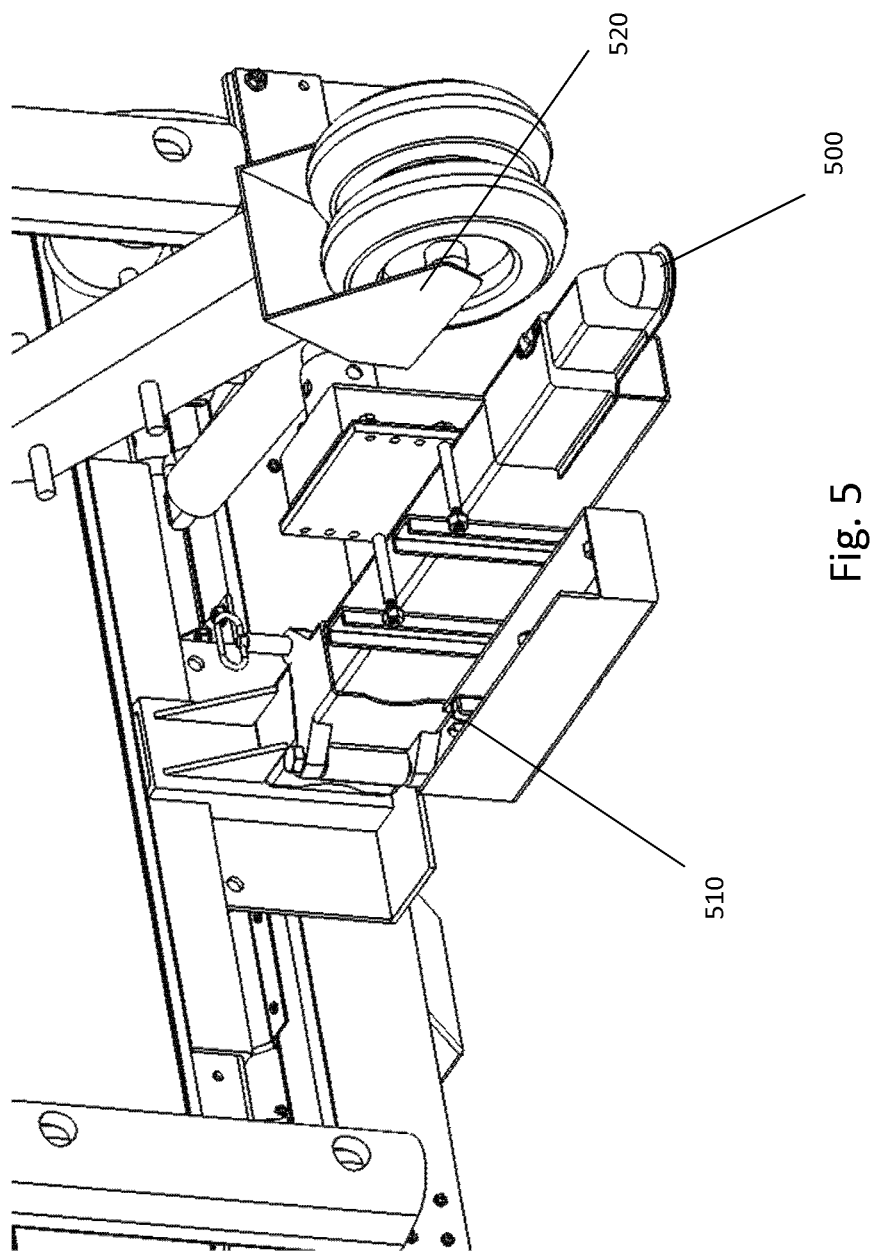
FIG. 5 is the front view of the extended trailer tongue with retracted trailer dolly.
Figure 6:
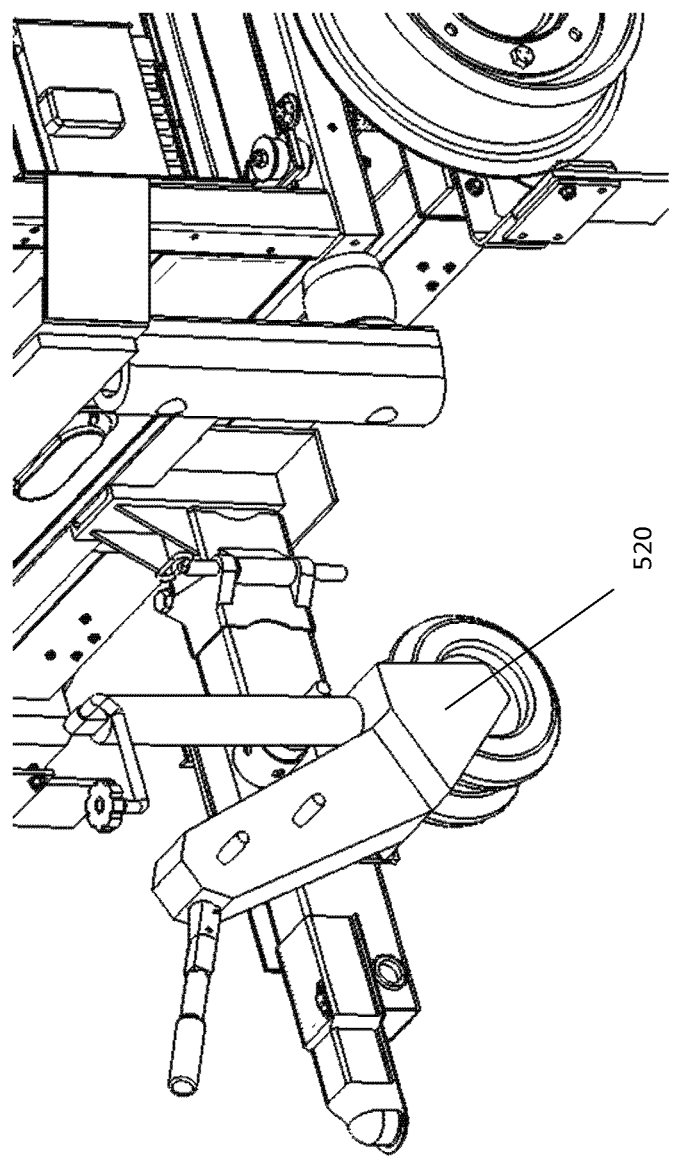
FIG. 6 is the front view of the trailer tongue with the trailer dolly extended.

Referring to FIG. 4, a pivoting trailer hitch allows for the vehicle and all of its parts required to operate in any mode to be self contained. In other words, all trailer parts are included with the vehicle when in rail operation and when in road operation. Trailer tongue 400 and hitch may pivot on tongue pivot 410 to move the hitch out of the way during rail operation. A dolly with additional wheels may also be attached to the trailer tongue. The pivoting trailer hitch is locked in place with removable locking pin 420 for both full extension and side pivot positions. Referring also to FIG. 5, when fully extended ball catch 500 is in a position to be connected to a ball hitch of a road vehicle. Alternative hitch connections may be used in place of the ball catch. Safety chains 510 are integrated into the pivoting trailer hitch to ensure safe containment of the trailer in case of ball catch/hitch failure. Trailer dolly 520 is normally retracted, but, referring also to FIG. 6, may be extended to engage additional wheels to the ground if required when moving the trailer into road or rail position. Trailer dolly 520 allows one person to maneuver the trailer into position on a railroad track or to re-attach the trailer to the back of a road vehicle. It is attached to the trailer tongue to pivot vertically into or out of use, so that it is out of the way during rail operations but available for use during road operations or when needing to position the trailer into the correct position. The trailer tongue supports tongue loads in excess of 5000 lbs and impact loads from shock or vibration in excess of 10 g's.

Other Embodiments

In an alternate embodiment, the fixed axle may instead be two smaller pivot axles, one on each side the trailer for pivoting the road wheel assembly on that side of the vehicle.

Figure 7:
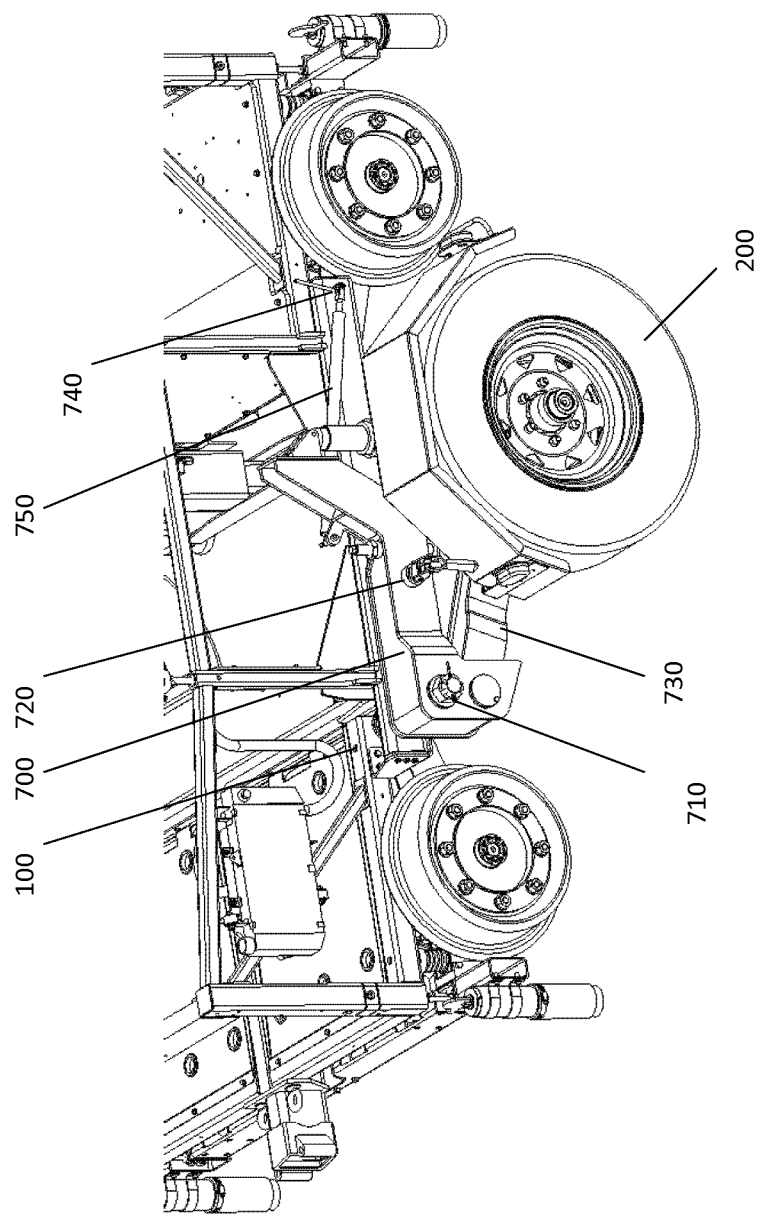
FIG. 7 is a side perspective view of the trailer with an alternate road wheel assembly.
Figure 8:
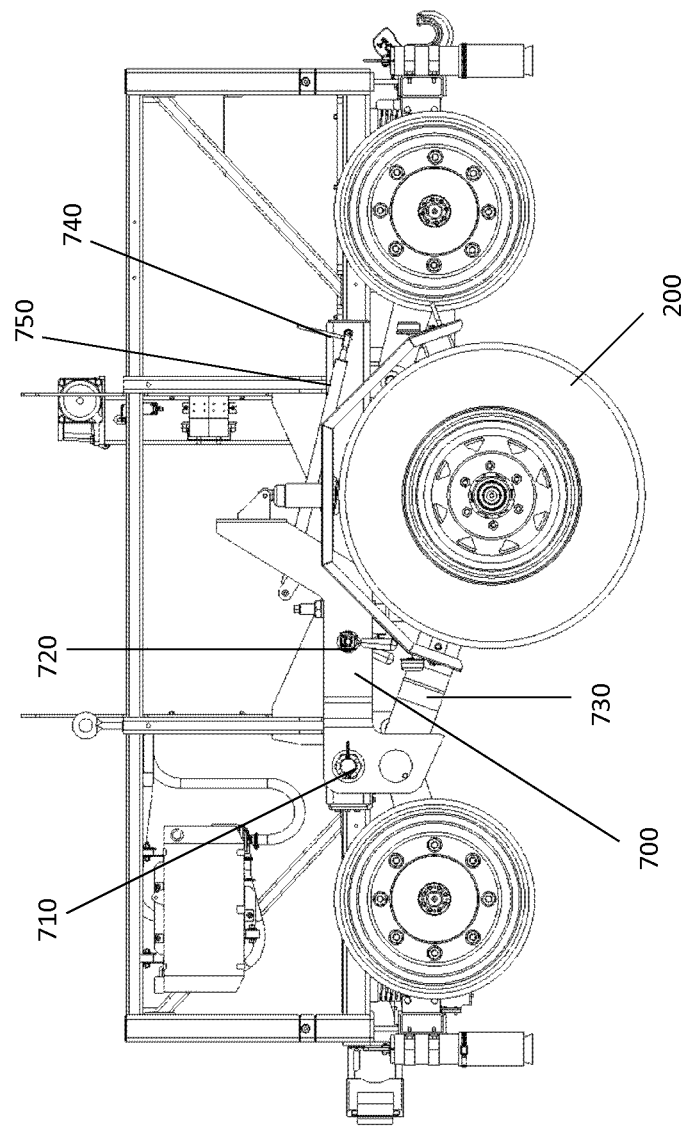
FIG. 8 is a side view of the trailer with alternate road wheel assembly of FIG. 7.

In an alternate embodiment, the road wheel assembly may use hydraulic struts to ease moving the wheel between engaged (lowered for road use) and disengaged (raised for rail use) positioning. Referring also to FIGS. 7 and 8, the alternate road wheel assembly may include wheel pivot arm 700 which rotates around main pivot 710. Main pivot 710 connects the road wheel assembly to chassis 100, and may be capped with a retaining nut to secure the wheel pivot arm to the main pivot. As an alternate to using a main pivot on each side of the trailer, a single fixed axle which extends across the trailer to connect to wheel assemblies on both sides may be used. Locking pin 720 restricts pivoting around the main pivot when positioned for road use. Wheel support arm 730 connects to wheel pivot arm 700, which connects to a short axle around which road wheel 200 may rotate. When the lift jack is extended, road wheel 200 is raised from contact with the ground. At that point, locking pin 720 may be released. Strut lever 740 may then be used to control hydraulic strut 750, which lifts and rotates the wheel assembly around main pivot 710. Referring also to FIG. 9, the road wheel assembly may pivot until strut 750 reaches its full extent, or the user releases strut lever 740. The road wheel assembly is then held in raised (disengaged from road) position by strut 750 until strut lever 740 is used to control and pivot the wheel assembly back down for engagement and road use.

In an alternate embodiment, it is possible to replace the electric lift jack with a lifting mechanism that raises and lowers the trailer wheels that could be manually, electrically, or hydraulically actuated obviating the need for the lift jack as a separate component.

In an alternate embodiment, the trailer tongue may exist as a component that can be physically removed instead of using a pivoting arm. It is also possible for the pivot on the hitch to operate in any desired direction for stowage when not in use.

In an alternate embodiment, the ball hitch may be replaced with alternative locking ball hitches or even different hitch solutions such as pintle hitches. These hitches may be mounted on the rear or even the forward side of the towing vehicle.

In an alternate embodiment, the trailer dolly may be electrically powered to raise and lower the trailer hitch rather than manually raised/lowered. The trailer dolly also may be removable. The trailer dolly also may be replaced with a ball hitch mounted dolly that may be part of the towing vehicle or the towed vehicle.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A vehicle convertible for use on both roadway and railways, comprising:
   a vehicle chassis;
   a vertical lift jack connected to the chassis;
   a stabilizing foot driven up or down relative to the chassis by the vertical lift jack;
   four railway wheels connected to the chassis;
   two road wheel assemblies connected to pivot relative to the chassis, each road wheel assembly including a road wheel such that the road wheel engages with the ground when the road wheel assembly is pivoted down, and the road wheel does not engage with the ground when the road wheel assembly is pivoted up; and
   two main pivots attached to opposite sides of the chassis, wherein each road wheel assembly connects to one of the main pivots;
   wherein each road wheel assembly further comprises:
   a wheel pivot arm which rotates around the main pivot connected to the road wheel assembly;
   a locking pin which engages to prevent movement of the road wheel assembly when pivoted down;
   a hydraulic strut connected to the wheel pivot arm;
   a strut lever for controlling the hydraulic strut to pivot the road wheel assembly;
   a wheel support arm connected to the wheel pivot arm; and
   a short axle connecting the wheel and the wheel support arm such that the wheel rotates around the short axle when engaged with the ground.

2. The vehicle of claim 1, further comprising a pivoting trailer hitch connected to a side of the chassis not having a road wheel assembly.

3. The vehicle of claim 2, wherein the trailer hitch comprises a ball catch at the end of a trailer tongue.

4. The vehicle of claim 3, further comprising a retractable wheeled dolly connected to the trailer tongue.

5. The vehicle of claim 1, wherein the lift jack has an acme screw connecting the lift jack to the stabilizing foot.

6. The vehicle of claim 5, further comprising a lift motor connected to gears driving the acme screw.

7. A vehicle convertible for use on both roadway and railways, comprising:
   a vehicle chassis;
   a vertical lift jack connected to the chassis;
   a stabilizing foot driven up or down relative to the chassis by the vertical lift jack;
   four railway wheels connected to the chassis;
   two road wheel assemblies connected to pivot relative to the chassis, each road wheel assembly including a road wheel such that the road wheel engages with the ground when the road wheel assembly is pivoted down, and the road wheel does not engage with the ground when the road wheel assembly is pivoted up; and a fixed axle connected to the chassis such that each road wheel assembly pivots around an opposite end of the fixed axle;

wherein each road wheel assembly further comprises:
- a retaining plate connected to the fixed axle;
- a locking mechanism for fixing the retaining plate at one or multiple positions on the fixed axle;
- a short axle connecting the retaining plate to the road wheel;
- a movement mechanism for sliding and pivoting the retaining plate on the fixed axle when the locking mechanism is unlocked.

8. The vehicle of claim 7, wherein the locking mechanism is one or more quick release pins.

9. The vehicle of claim 7, wherein the movement mechanism comprises a front handle and a rear handle.

10. The vehicle of claim 7, further comprising a pivoting trailer hitch connected to a side of the chassis not having a road wheel assembly.

11. The vehicle of claim 10, wherein the trailer hitch comprises a ball catch at the end of a trailer tongue.

12. The vehicle of claim 11, further comprising a retractable wheeled dolly connected to the trailer tongue.

13. The vehicle of claim 7, wherein the lift jack has an acme screw connecting the lift jack to the stabilizing foot.

14. The vehicle of claim 13, further comprising a lift motor connected to gears driving the acme screw.

* * * * *